(12) United States Patent
Fleckenstein et al.

(10) Patent No.: US 11,504,877 B2
(45) Date of Patent: Nov. 22, 2022

(54) MODIFIED WOOD PRODUCT AND A PROCESS FOR PRODUCING SAID PRODUCT

(71) Applicant: Stora Enso OYJ, Helsinki (FI)

(72) Inventors: Marco Fleckenstein, Neustadt am Main (DE); Vladimirs Biziks, Niederniesa (DE); Holger Militz, Bovenden (DE); Carsten Mai, Göttingen (DE); Duncan Mayes, Helsinki (FI); Janne Pynnönen, Lempäälä (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 16/955,908

(22) PCT Filed: Dec. 18, 2018

(86) PCT No.: PCT/IB2018/060226
§ 371 (c)(1),
(2) Date: Jun. 19, 2020

(87) PCT Pub. No.: WO2019/123230
PCT Pub. Date: Jun. 27, 2019

(65) Prior Publication Data
US 2021/0016466 A1    Jan. 21, 2021

(30) Foreign Application Priority Data

Dec. 22, 2017 (SE) .................... 1751636-0

(51) Int. Cl.
*B27K 3/15*    (2006.01)
*B01J 23/04*   (2006.01)
(Continued)

(52) U.S. Cl.
CPC ............... *B27K 3/15* (2013.01); *B01J 23/04* (2013.01); *B27K 3/0207* (2013.01);
(Continued)

(58) Field of Classification Search
None
See application file for complete search history.

(56) References Cited

U.S. PATENT DOCUMENTS

| 4,537,941 A | 8/1985 | Kambanis et al. |
| 4,752,509 A | 6/1988 | Simonson et al. |

(Continued)

FOREIGN PATENT DOCUMENTS

| CN | 104985657 A | 10/2015 |
| CN | 106008867 A | 10/2016 |

(Continued)

OTHER PUBLICATIONS

Fleckenstein et al.; Modification of Beech Veneers with Lignin Phenol Formaldehyde Resins in the Production of Laminated Veneer Lumber (LVL); European Journal of Wood and Wood Products; 76:843-851; 2017.*

(Continued)

*Primary Examiner* — Michael P. Rodriguez
(74) *Attorney, Agent, or Firm* — Greer, Burns & Crain, Ltd.

(57) ABSTRACT

The present invention relates to a process for preparing a modified wood product wherein the wood is treated with low-molecular weight resin based on lignin degradation products. The present invention also relates to a modified wood product produced using said process.

11 Claims, 11 Drawing Sheets

(51) Int. Cl.
*B27K 3/02* (2006.01)
*B27K 5/00* (2006.01)
*C07G 1/00* (2011.01)
*C08J 7/18* (2006.01)
*E04C 3/12* (2006.01)

(52) U.S. Cl.
CPC ............ *B27K 3/0278* (2013.01); *B27K 5/007* (2013.01); *C07G 1/00* (2013.01); *C08J 7/18* (2013.01); *C08J 2397/02* (2013.01); *E04C 3/12* (2013.01)

(56) References Cited

U.S. PATENT DOCUMENTS

| | | | | |
|---|---|---|---|---|
| 5,202,403 | A | * | 4/1993 | Doering ................ C08G 8/38 525/54.42 |
| 5,246,739 | A | | 9/1993 | Lin |
| 2004/0115460 | A1 | * | 6/2004 | Torgovnikov ....... B27K 3/0221 428/541 |
| 2005/0170165 | A1 | | 8/2005 | Westin |
| 2009/0208767 | A1 | | 8/2009 | Ahlnäs |
| 2014/0046041 | A1 | | 2/2014 | South et al. |
| 2015/0210904 | A1 | * | 7/2015 | Cothran ................ B32B 21/14 156/283 |
| 2017/0137446 | A1 | * | 5/2017 | Feghali ................ C07F 7/1804 |

FOREIGN PATENT DOCUMENTS

| | | |
|---|---|---|
| CN | 106395621 A | 2/2017 |
| EP | 2162238 A1 | 3/2010 |
| EP | 3211024 A1 | 3/2013 |
| RU | 2005104825 A | 10/2005 |
| RU | 2007129643 A | 2/2009 |
| WO | 2004011216 A1 | 2/2004 |
| WO | 2006031175 A1 | 3/2006 |
| WO | 2006072659 A1 | 7/2006 |
| WO | 2008155466 A1 | 12/2008 |
| WO | 2013130101 A1 | 9/2013 |
| WO | 2016157141 A1 | 10/2016 |
| WO | 2017056013 A2 | 4/2017 |

OTHER PUBLICATIONS

Goncalves et al.; Hydroxymethylation and Oxidation of Organosolv Lignins and Utilization of the Products; Bioresource Technology; 79:103-111; 2001.*

Ahmed, Ali, et al., Effect of Oil impregnation on water repellency, dimensional stability and mold susceptibility of thermally modified European aspen and downy birch wood, J Wood Sci (2017), 63:74-82.

Chirkova, Jelena, et al., Lignins as agents for bio-protection of wood, Holzforschung, vol. 65, pp. 497-502, 2011.

Fleckenstein, Marco et al., Modification of beech veneers with lignin phenol formaldehyde resins in the production of laminated veneer lumber (LVL), European Journal of Wood and Wood Products (2018), 76:843-851.

Supplemental partial European Search Report for corresponding European application No. EP18891253, completed on Jul. 14, 2021.

Ang, A.F. et al, Possibility of Improving the Properties of Mahang Wood (*Macaranga* sp.) through Phenolic Compreg Technilque, Sains Malaysiana 43(2)(2014):219-225.

Klein, Louis et al., Comparisons of Methods for Improving Wood, Industrial and Engineering Chemistry, vol. 36, No. 3, pp. 252-256.

* cited by examiner

MODIFIED WOOD PRODUCT AND A PROCESS FOR PRODUCING SAID PRODUCT

This application is a U.S. National Phase under 35 U.S.C. § 371 of International Application No. PCT/IB2018/060226, filed Dec. 18, 2018, which claims priority under 35 U.S.C. §§ 119 and 365 to Swedish Application No. 1751636-0, filed Dec. 22, 2017.

FIELD OF THE INVENTION

The present invention relates to a process for preparing a modified wood product wherein the wood is treated with low-molecular weight resin based on lignin degradation products. The present invention also relates to a modified wood product produced using said process.

BACKGROUND

Many wood species that are untreated are very susceptible to influences caused by the external environment. Untreated wood that is exposed to moisture and/or soil for sustainable periods of time will become weakened by attacks by various types of microorganisms or insects. It is therefore of importance to treat the less durable wood in order to increase its resistance against moisture and fungal attack. In addition wood which is exposed to Ultra Violet radiation is susceptible to discoloration and deterioration.

There exist a number of different treatment methods which will increase the resistance of wood. Chemical treatments of wood in order to increase the biological durability and strength have been used for a long time. Many different chemicals may be added. These chemicals are normally called fungicides and they will provide long-term resistance to organisms that cause deterioration of the wood. If it is applied correctly, it can extend the productive life of timber by five to ten times.

Another known method to improve the resistance of wood is to treat the wood at high temperatures to thermally modify the wood. During heat modification, certain organic compounds found in the wood will be removed and thereby decreases the possibility for fungi and rot to thrive on the wood. Thus, by heating wood to a certain temperature, it may be possible to make the ligno-cellulosic fibers less appetizing to fungi and insects. Heat modification can also improve the properties of the wood with respect to moisture both liquid and humidity, i.e. lower equilibrium moisture content, less moisture deformation, and improved weather resistance. One potential downside of thermally modified wood is the reduction in strength both in bending strength and surface hardness as a result of the modification process which might limit the areas of application and lead to faster appearance degradation.

For decades, low-molecular weight phenol formaldehyde (PF) resins with different average molecular weights have been applied in chemical wood modification. Wood specimens are treated with PF resins by means of vacuum or vacuum-pressure processes to be able to incorporate the resins into the wood structure. The impregnated specimens are then slowly dried, so that the resin is cured. This modification process improves the dimensional stability and durability of the impregnated wood, making it suitable to use it for external applications.

There has been significant development related to partial replacement of phenol in PF resins and parts of PF resins with the use of lignin. The primary use of the formulations have been as adhesives in the wood-based panel manufacture (for example: plywood, particleboards and MDF). It is commonly known that lignin in its basic form cannot penetrate into the wood cell wall, because of its high molecular weight and the negative steric effects of the lignin molecule. So far the state of the art has therefore not aimed at cell wall penetration and has concentrated on lumen filling, at best, to meet the requirements of wood adhesives.

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network, has been extensively investigated as a suitable substitute for phenol during production of phenol-formaldehyde resins. During synthesis of such resins, phenol, partially replaced by lignin, is reacted with formaldehyde in the presence of either basic or acidic catalyst to form a highly cross-linked aromatic resins termed novolacs (when utilizing acidic catalysts) or resoles (when utilizing basic catalysts).

There is thus a need for an improved modified wood product. There is also a need for improved processes for preparing modified wood products.

SUMMARY OF THE INVENTION

The present invention presents a novel method of treating solid wood products with a unique synthesized low molecular weight lignin resin for use in wood modification and has been found to improve the moisture stability, weather resistance and biological durability of the wood to a level comparable to or than the known fully phenol based resins.

Another object of the present invention is a modified wood product prepared according to the method of the present invention.

These objects and other advantages are achieved by the process and the product according to the independent claims.

The present invention relates to a process for preparing a modified wood product, comprising the steps of
 a) providing lignin;
 b) degrading the lignin into lignin cleavage products;
 c) fractionating the lignin cleavage products;
 d) selecting one or more fraction of lignin cleavage products;
 e) optionally chemically modifying the selected lignin cleavage products;
 f) preparing a phenol-formaldehyde resin comprising the optionally chemically modified lignin cleavage products;
 g) treating wood with the phenol-formaldehyde resin comprising the optionally chemically modified lignin cleavage products to obtain a modified wood product.

The moisture content of the wood to be treated in the process according to the present invention is typically 0% to 15%, such as 8-12%.

The wood to be treated in the process according to the present process is solid wood and may be either softwood or hardwood. Examples of hardwood that may be modified in accordance with the present invention include beech and birch. The wood to be modified in accordance with the present invention may be a veneer, such as a veneer for use or being used in LVL (laminated veneer lumber) or plywood.

The wood to be modified according to the present process may be unmodified prior to the treatment with the phenol-formaldehyde resin comprising the optionally chemically modified lignin cleavage products. Alternatively, the wood to be modified according to the present invention may have been modified by other means prior to the treatment with the phenol-formaldehyde resin comprising the optionally chemically modified lignin cleavage products. For example, the wood may have been subjected to thermal modification by heating the wood at a temperature of from 160° C. to 230° C. at atmospheric pressure or at a temperature of from 120° C. to 230° C. at a pressure higher than atmospheric pressure.

The step of degrading the lignin can be carried out using methods known in the art. Examples of such methods for degrading lignin are degradation with catalyst (such as bases or acids), degradation with ionic liquids, pyrolysis (see e.g. Vasile et al. Cellulose Chem Technol 44 (2010), 353-363) and microwave degradation.

The step of fractionating the lignin cleavage products can be carried out according to methods known in the art. For example, fractionation by vacuum distillation can be used. Another example of fractionation is by liquid/liquid extraction, according to methods known in the art.

At least 50 wt-% of the lignin used in resin preparation according to the present invention has been degraded into lignin cleavage products. Preferably, at least 60 wt-%, such as at least 70 wt-%, at least 80 wt-%, at least 90 wt-%, at least 90 wt-%, at least 95 wt-%, at least 98 wt-% or at least 99 wt-% of the lignin used in resin preparation according to the present invention has been degraded into lignin cleavage products. Preferably, the lignin cleavage products have a molecular weight of less than 450 g/mol, such as less than 300 g/mol or less than 135 g/mol, such as less than 125 g/mol. In one embodiment, the lignin is degraded into bio-oils using methods known in the art.

The present invention also relates to wood treated according to the process described herein. In one embodiment of the present invention, the treated wood is softwood. In one embodiment of the present invention, the treated wood is hardwood.

DETAILED DESCRIPTION

Figure 1:
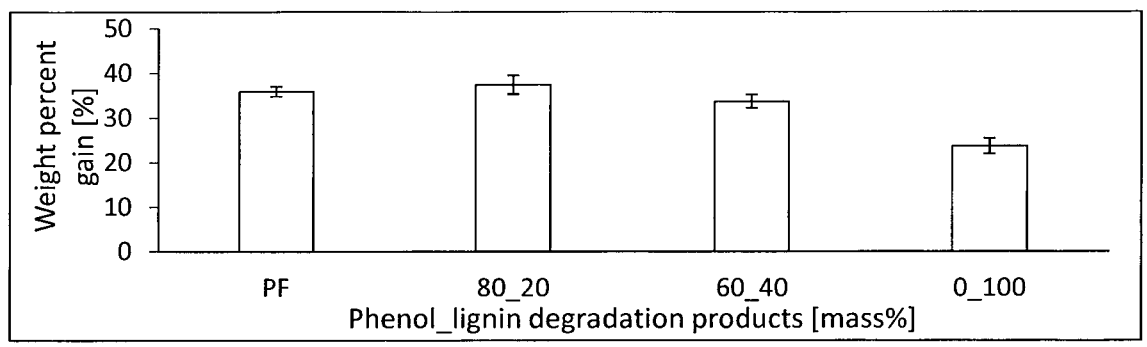
FIG. 1: WPG after chemical wood modification
Figure 2:
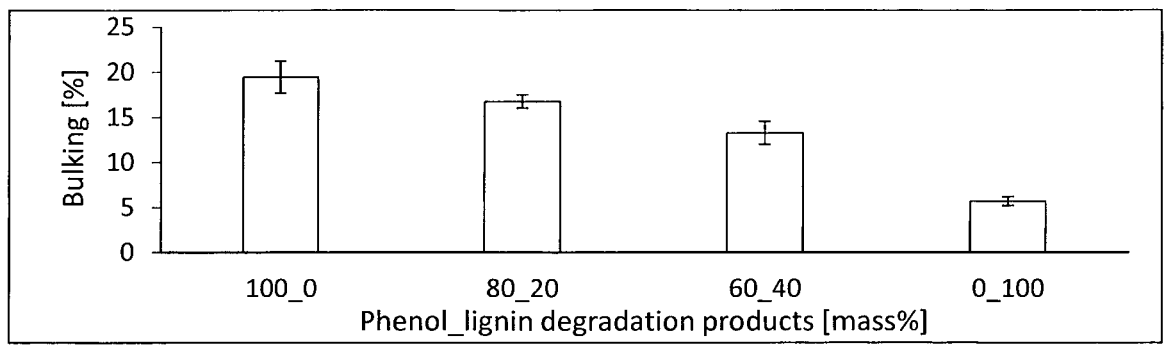
FIG. 2: Cross-sectional bulking of the specimens due to chemical wood modification

The lignin used in accordance with the present invention is any type of lignin, such lignin originated from hardwood, softwood or annular plants. The lignin may for example originate from the Kraft process or the organosolv process. Preferably the lignin is an alkaline lignin generated in e.g. the Kraft process. The lignin may then be separated from the black liquor by using the process disclosed in WO2006031175.

The lignin cleavage products used in accordance with the present invention typically have a molar mass of less than 450 g/mol, such as less than 300 g/mol or less than 135 g/mol, such as less than 125 g/mol. Preferably, the lignin cleavage products are polar, to facilitate penetration into the wood cell wall. Preferably, the lignin cleavage products used in accordance with the present invention have sufficient functionality, defined as the amount of free positions on the aromatic ring. Preferably, the lignin cleavage products have at least two free positions on the aromatic ring, i.e. are bifunctional. The lignin cleavage products may also be trifunctional, i.e. have three available positions for reaction on the aromatic ring.

The moisture content of the wood to be treated in the process according to the present invention is typically 0% to 15%. Preferably, the moisture content is from 8% to 15%, such as from 8% to 12%. The moisture content may be close to the fiber saturation point. The moisture content as well as the fiber saturation point of wood can be determined using methods known in the art.

In one embodiment of the present invention, the resin treatment is done at elevated pressure, i.e. above 1 bar, during room temperature or ambient temperature, such as from 20° C. to 50° C. or from 20° C. to 40° C. In one embodiment, the pressure resin treatment is performed in vacuum or at a lower pressure than atmospheric pressure.

The lignin cleavage products can be chemically modified before resin synthesis. Examples of such chemical modification include hydroxymethylation and hydroxyethylation and can be carried out using methods known in the art. For example, hydroxymethylation of lignin cleavage products can be carried under basic reaction conditions. Further examples of chemical modifications include demethylation and phenolation, according to the methods known in the art.

There are several methods for preparing the resins. For example, mixtures of lignin cleavage products with low-molecular weight PF resins can be prepared and used as a resin. Alternatively, mixtures of lignin cleavage products with phenol and subsequent hydroxymethylation. Alternatively, hydroxymethylation of lignin cleavage products (without phenol) can be carried out. Alternatively, the degraded lignin is used in the form of bio-oils with characteristic phenols and subsequent hydroxymethylation.

The resin used in the process according to the present invention can be prepared by adding phenol and formaldehyde to a mixture comprising the optionally chemically modified lignin cleavage products. Typically, the amount of phenol added is approximately the same as the amount of lignin cleavage products, but it is appreciated that more or less phenol can be added depending on what type of resin composition is desired. The heating is typically carried out at a temperature of 60-95° C. such as 70-85° C. for 2-8 hours such as 4-8 hours. The water solubility of the resin can be measured to determine whether or not the resin synthesis has been completed.

The resin solution used when treating the wood is normally an aqueous solution containing from 1% to 80% by weight of resin. In one embodiment of the present invention, the resin solution contains from 10% to 15% of resin, but also higher concentrations can be used, such as an aqueous solution containing 60-80% by weight of resin. Soft vacuum distillation can be used if it is desirable to achieve high solid content and low amounts of free formaldehyde. The pH of the resin solution is generally in the above pH 7, preferably above pH 9, more preferably in the range of from pH 9 to pH 11. The resin solution may optionally contain additional components such as pigments, surfactants, curing agents, pH stabilizers and fire retardants.

The resin solution can be applied on the wood by brushing, injecting, spraying, by vacuum impregnation, vacuum-pressure impregnation, dipping or by immersion. The quantity of resin applied on the wood can be 10-400 $g/m^2$, advantageously 10-150 $g/m^2$, preferably 30-100 $g/m^2$ and most advantageously about 50 $g/m^2$, when calculated as hardened from dry matter. The resin uptake can be in the range of 50 $kg/m^3$ to 400 $kg/m^3$ or more. The resin uptake can be determined by measuring the increased weight of the wood following impregnation.

The resin treatment may be followed by a drying and/or curing step, in which the wood treated with the phenol-formaldehyde resin comprising the optionally chemically modified lignin cleavage products is dried and/or cured using methods known in the art. The drying and/or curing can be performed at ambient temperature, such as room temperature, or at elevated temperature.

The wood to be treated according to the present invention may optionally be densified during or after the modification. The densification may be done by applying pressure to the wood. The densification may be done at a pressure of 1-3 $kg/cm^2$ and the maximum compression should be about 10% of the thickness of the wood.

For the optional densification, it is preferred to apply both pressure and heat, since this combination will improve the densification of the wood. The densification may be done off-line, on-line or in-line, i.e. in-line with the process according to the invention. If off-line densification is used, it is possible to use a hot press after the step in which the wood is treated with the phenol-formaldehyde resin comprising the optionally chemically modified lignin cleavage products. If in-line densification is used, it is possible to use roller or plate based systems. The densification can be done during or separately from modification step.

By densifiying the wood, which is optional in the context of the present invention, the surface of the wood will become more set, i.e. the fibers on the surface have less tendency to react with moisture and retain its original form. This also leads to reduced tendency of fiber loosening on the surface of the wood. The surface density and thus also the hardness of the wood will also be improved.

If densification of the wood is to be carried out, it is preferably done after the process of modifying the wood, i.e. after step g) of the process according to the present invention.

The present invention also relates to wood treated in to the process according to the present invention.

The produced wood can be used for the production of many different products, such as cladding, decking, window and door profiles, light poles, jetties, joinery, furniture etc. In view of its moisture resistant properties, the wood is particularly useful for use in applications in which it is likely to be exposed to moisture.

The term "wood" as used herein is defined as a solid wood component of any kind of wood species, including wood veneers, such as wood veneers of softwood and hardwoods that are easy to impregnate.

EXAMPLES

Example 1

Lignin was cleaved by using sodium hydroxide as catalyst. The cleavage products were purified by liquid-liquid extraction with ethyl acetate. The ethyl acetate was removed by using a rotary evaporator (Schmiedl et al. 2012). The obtained lignin cleavage products (35 g) were mixed with phenol (mass %): example 80_20 means: 80 mass % phenol and 20 mass % lignin cleavage products. During the resinification step 0.24 mol formaldehyde and 0.06 mol sodium hydroxide were added. Resinification: 65° C., 4h. Solid content of the resin after synthesis was 35%. A synthesized PF resin (same reaction conditions) served as a reference resin (100_0). Untreated beech sapwood samples 25×25×10 $mm^3$ (radial×tangential×longitudinal) were vacuum impregnated (0.5 h, 100 mbar) and finally remained in the solution for 2 h at atmospheric pressure. The impregnated specimens were slowly dried at increasing temperatures (25° C. up to 103° C.) for 96 h before the resin was completely cured at 140° C. for 1 h. Cross-sectional bulking (BC), weight-percent gain (WPG), anti shrink/ swell efficiency (ASE) and water uptake were measured. To determine the maximal water uptake, the samples were vacuum impregnated for 30 min at 100 mbar in water. Finally, the specimens remained 24 h in water at atmospheric pressure.

The WPG of the specimens impregnated with the resins PF, 80_20 and 60_40 were not significantly different. A complete phenol substitution (0_100) resulted in a decreased WPG (FIG. 1).

Figure 3:
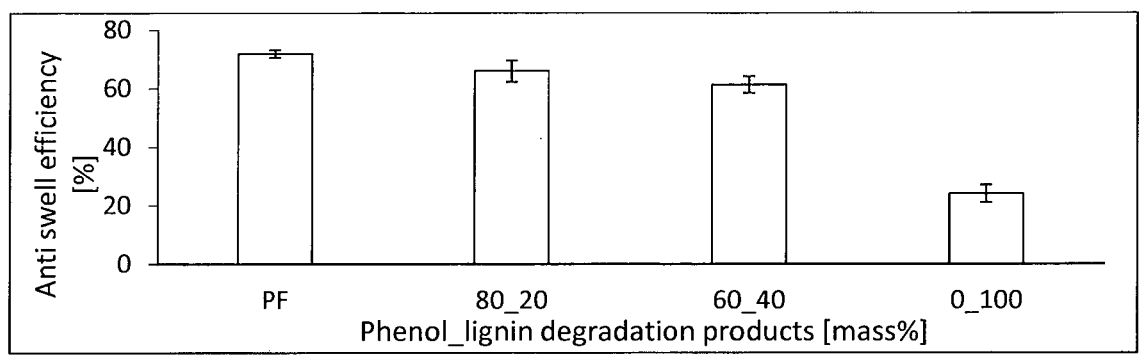
FIG. 3: Dimensional stability of modified specimens

The dimensional stability (FIG. 3) of the modified specimens increased with increasing phenol content. But a 40% phenol substitution (60_40) resulted in only small decrease in dimensional stability compared to PF resin.

Figure 4:
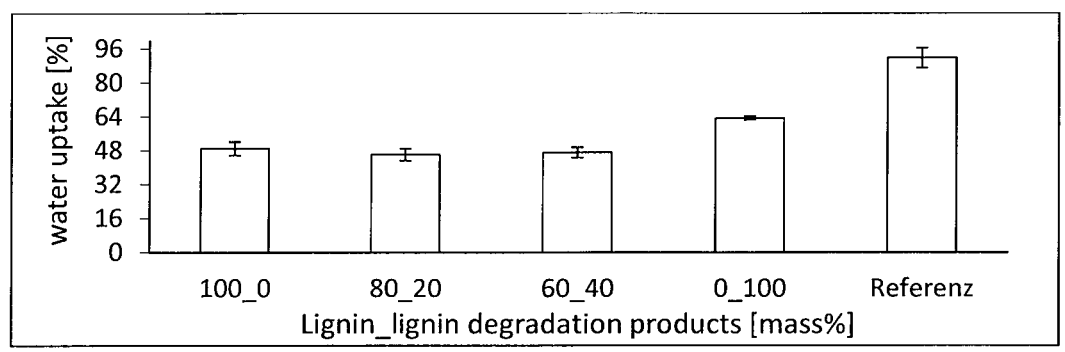
FIG. 4: Water uptake of the modified specimens compared to untreated specimens (Referenz)

Water uptake (FIG. 4) of specimens modified with PF, 80_20 and 60_40 resins was very similar with no significant differences. A 100% phenol substitution resulted in an increased water uptake compared to specimens modified with the reference PF resin. But the water uptake was still lower compared to unmodified wood (Referenz).

Example 2

Kraft lignin was liquefied by using catalysts (zeolites) and microwave energy. Three resins were synthesized: reference PF resin (PF), 40% substituted phenol (60_40) and 100% substituted phenol (0_100). For resin synthesis 0.64 mol formaldehyde and 0.04 mol sodium hydroxide were added. Resinification: 65° C., 4 h. Solid content of the resins was 30%. Untreated beech wood specimens of 25×25×10 $mm^3$ (radial, tangential, longitudinal) dimensions were vacuum impregnated (0.5 h, 100 mbar) and finally remain in the solution for 2 h at atmospheric pressure. The impregnated specimens were slowly dried with rising temperatures (25° C. up to 103° C.) for 96 h before the resin was completely cured at 140° C. for 1 h. Cross-sectional Bulking (BC), weight-percent gain (WPG), Anti shrink/ swell efficiency (ASE) and water uptake were measured. To determine the maximal water uptake, the samples were vacuum impregnated for 30 min at 100 mbar in water. Finally, the specimens remain 24 h in water at atmospheric pressure.

Figure 5:
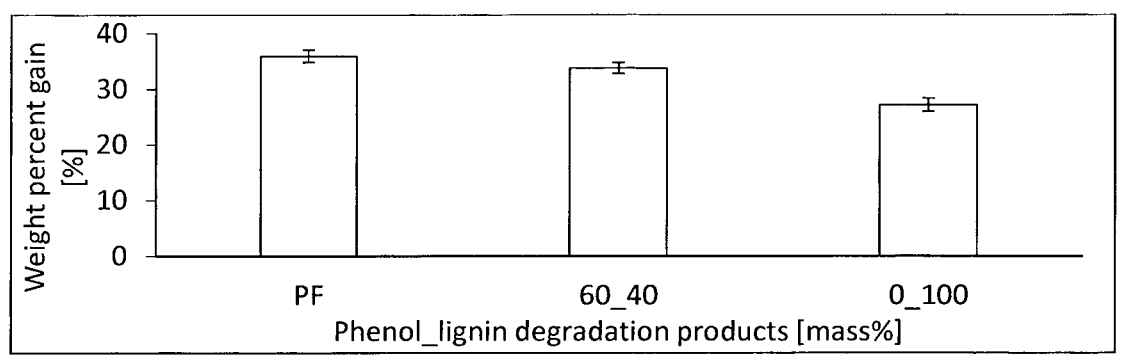
FIG. 5: WPG of the chemically modified test specimens
Figure 6:
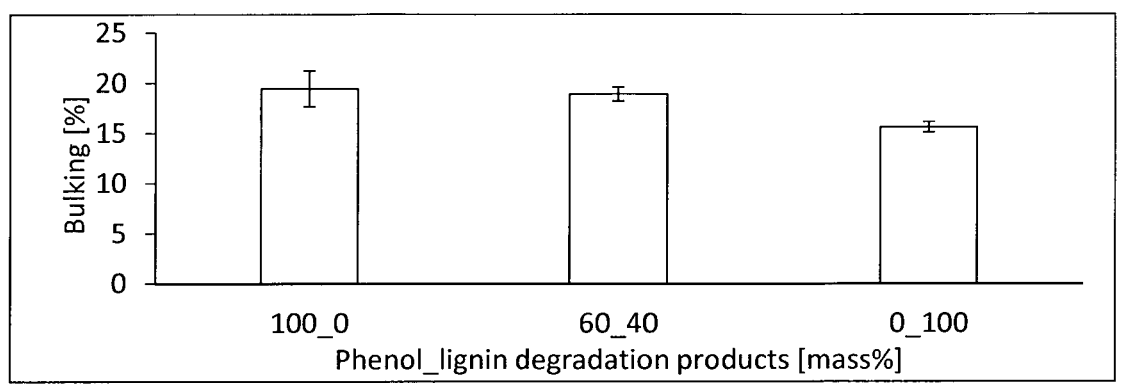
FIG. 6: Cross-sectional bulking of the specimens after chemical wood modification

The WPG of the specimens modified with PF and 60_40 resins were similar (FIG. 5). A 100% phenol substitution (0_100) caused a lower WPG compared to specimens modified with reference PF resin.

The increased dimension of specimens after chemical wood modification (bulking) showed no significant differences of specimens modified with PF resin or 60_40. Compared to specimens modified with PF resin, the bulking of specimens modified with 100% degradation products were lower. This can be explained by a decreased uptake of lignin degradation products by the wood cell wall.

Figure 7:
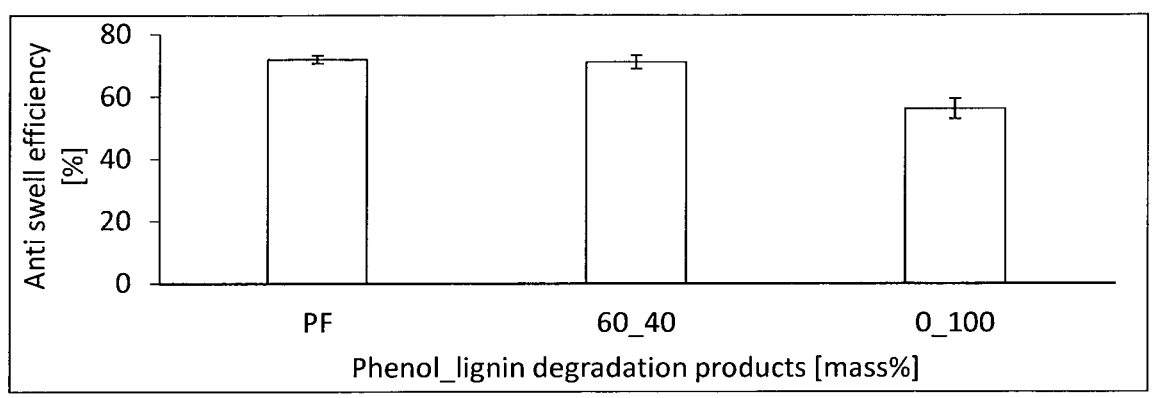
FIG. 7: Dimensional stability of the modified specimens
Figure 8:
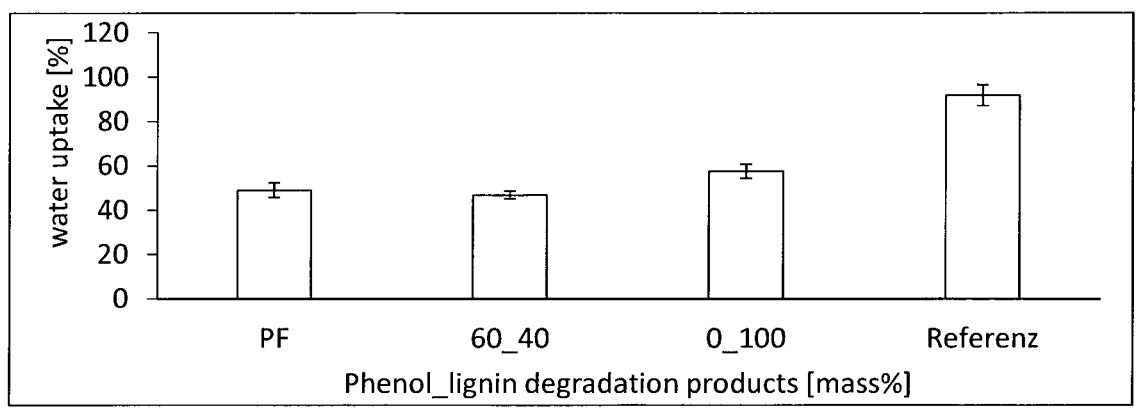
FIG. 8: Water uptake of the modified specimens compared to untreated specimens (Referenz)

The dimensional stability (FIG. 7) of modified specimens showed that there were no significant differences between specimens modified with reference PF resin and 60_40. The specimens impregnated with 0_100 exhibited reduced dimensional stability.

Modifications with the resins PF, 60_40 and 0_100 resulted in a decreased water uptake compared to untreated specimens. Water uptake of specimens modified with PF and 60_40 were very similar.

Example 3

Lignin is a potential source for aromatics if sufficiently depolymerized. Detected mono-aromatic lignin degradation products were mixed (mass %) to obtain a bio-based bio-oil. Table 1 shows the bio-oil composition (mass %).

TABLE 1

Composition of the bio-oil constituents

Mono-aromatic phenols in mass %

| Harz | Phenol | Guaiacol | Catechol | o-Cresol | p-Cresol |
|---|---|---|---|---|---|
| A | 6.0 | 22.5 | 66.2 | 2.0 | 3.3 |
| B | 12.0 | 48.0 | 36.0 | 0.0 | 4.0 |
| C | 18.2 | 45.5 | 36.4 | 0.0 | 0.0 |
| D | 33.5 | 11.5 | 35.0 | 3.0 | 17.0 |
| E | 50.3 | 12.2 | 18.8 | 3.3 | 15.5 |
| F | 54.7 | 0.0 | 1.8 | 4.9 | 38.6 |
| G | 57.8 | 0.6 | 0.0 | 4.2 | 37.3 |
| H | 100.0 | 0.0 | 0.0 | 0.0 | 0.0 |

The resins were synthesized by adding formaldehyde and sodium hydroxide during the resinification (molar ratio phenol:formaldehyde:sodium hydroxide=1:1.5:0.1). The solid content of the resins was between 31% and 38%. Untreated pine sapwood samples with dimensions of 25×25×10 mm$^3$ (radial, tangential, longitudinal) were vacuum impregnated (0.5 h, 100 mbar) and finally remained in the solution for 2 h at atmospheric pressure. The impregnated specimens were slowly dried with rising temperatures (25° C. up to 103° C.) for 96 h before the resin was completely cured at 140° C. for 1 h. Cross-sectional bulking (BC), weight-percent gain (WPG), anti shrink/swell efficiency (ASE) and water uptake were measured. To determine the maximal water uptake, the samples were vacuum impregnated for 30 min at 100 mbar in water. Finally, the specimens remained 24 h in water at atmospheric pressure.

Figure 9:
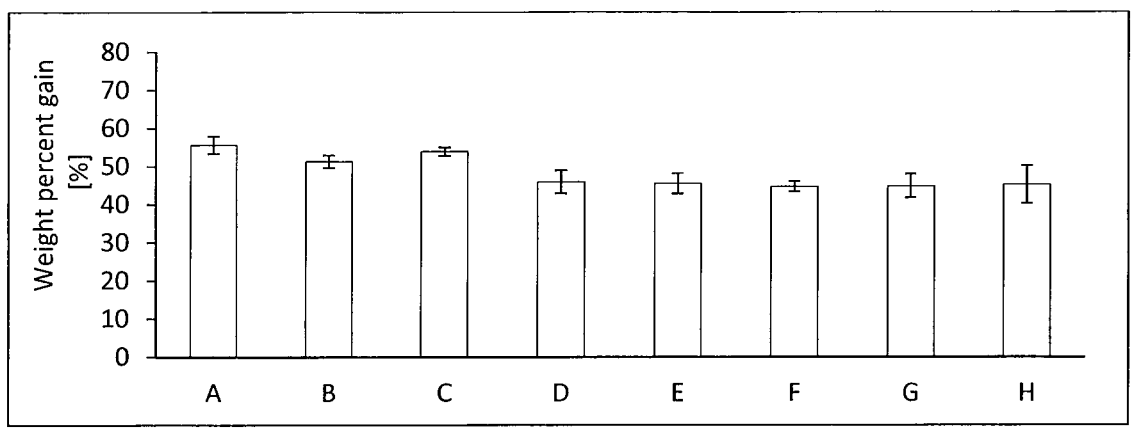
FIG. 9: WPG of wood specimens modified with bio-oil constituents
Figure 10:
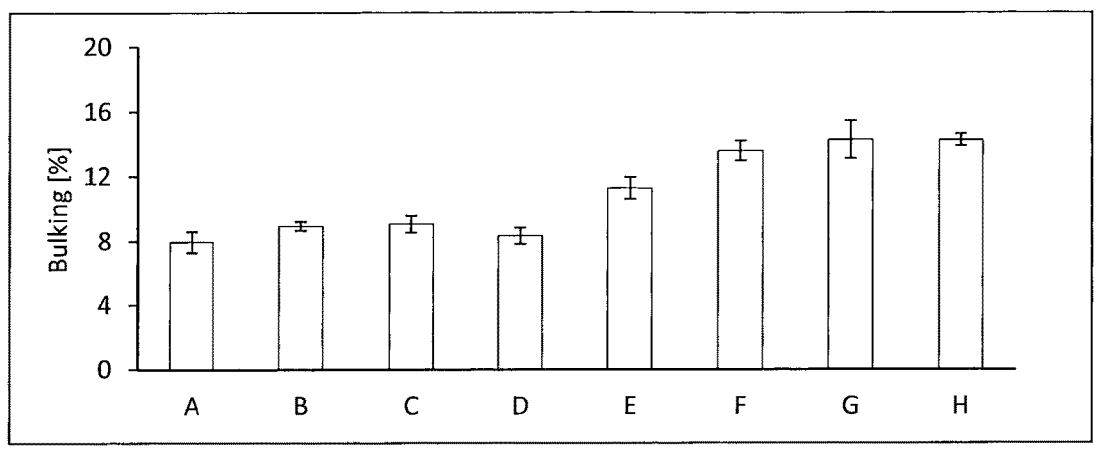
FIG. 10: Cross-sectional bulking of wood specimens modified with bio-oil constituents

The WPG of the specimens modified with resins A-C was higher than that of specimens modified with resins D-H (FIG. 9). This can be explained by a higher solid content of resins A-C of about 20% compared to resins D-H.

All synthesized resins were able to penetrate into the cell wall but in different amounts. Specimens modified with reference PF resin, resin G and H resulted in higher bulking values than specimens modified with resins A-E.

Figure 11:
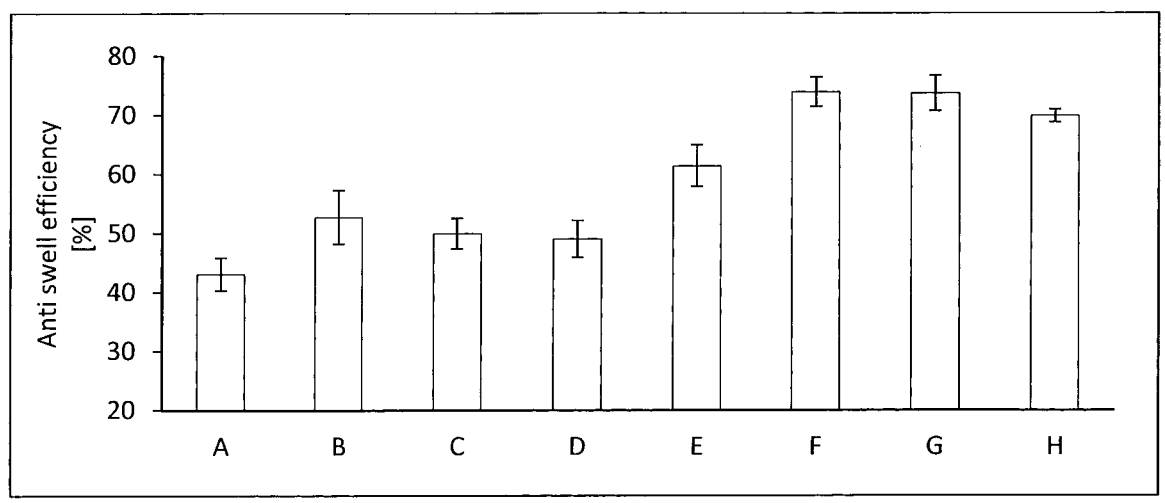
FIG. 11: Dimensional stability of wood specimens modified with bio-oil constituents

Specimens modified with the resins A-E showed a significantly lower dimensional stability (FIG. 11) than specimens modified with reference PF resin (H). This can be explained with reduced uptake of resin by the cell wall. Specimens modified with resins F and G showed results comparable to specimens modified with reference PF resin. This shows that specific bio-oils can completely substitute the phenol component in PF resins.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for preparing a modified wood product, comprising the steps of:
    a) providing lignin;
    b) degrading the lignin into lignin cleavage products;
    c) fractionating the lignin cleavage products;
    d) selecting one or more fractions of lignin cleavage products;
    e) preparing a phenol-formaldehyde resin comprising the selected lignin cleavage products, wherein a ratio of lignin cleavage products to phenol is at least 2:3;
    f) treating wood with the phenol-formaldehyde resin comprising the selected lignin cleavage products to obtain a modified wood product,
    wherein the phenol-formaldehyde resin of step e) is prepared by adding formaldehyde to a mixture comprising phenol and the legnin cleavage products.

2. The process according to claim 1, wherein the lignin is degraded by using sodium hydroxide as catalyst or by using a catalyst and microwave energy.

3. The process according to claim 1, wherein the lignin cleavage products are chemically modified before step c) by hydroxymethylation.

4. The process according to claim 1, wherein the wood has a moisture content of about 12%.

5. The process according to claim 1, wherein the lignin is kraft lignin.

6. The process according to claim 1, wherein the wood has been thermally modified prior to modification with the phenol-formaldehyde resin comprising the selected lignin cleavage products.

7. The process according to claim 1, wherein the wood is densified during or after treatment with the phenol-formaldehyde resin comprising the selected lignin cleavage products.

8. A modified wood product obtained by the process according to claim 1.

9. The modified wood product according to claim 8, wherein the wood is a softwood or hardwood.

10. The process of claim 1 further comprising:
    manufacturing cladding, decking, window and door profiles, light poles, jetties, joinery or furniture with the modified wood product.

11. The process of claim 1 further comprising:
    chemically modifying the selected lignin cleavage products prior to preparing the phenol-formaldehyde resin.

* * * * *